(12) United States Patent
Zuo et al.

(10) Patent No.: US 7,131,871 B1
(45) Date of Patent: Nov. 7, 2006

(54) CHIP CARD RETAINING MECHANISM

(75) Inventors: Zhou-Quan Zuo, Shenzhen (CN);
 Chia-Hua Chen, Tu-Cheng (TW)

(73) Assignee: FIH Co., Ltd., Shindian (TW)

( * ) Notice: Subject to any disclaimer, the term of this patent is extended or adjusted under 35 U.S.C. 154(b) by 0 days.

(21) Appl. No.: 11/454,488

(22) Filed: Jun. 16, 2006

(30) Foreign Application Priority Data

Sep. 16, 2005 (CN) .......................... 200510037369

(51) Int. Cl.
 *H01R 24/00* (2006.01)
(52) U.S. Cl. .................. 439/630; 439/299; 439/928.1; 455/558
(58) Field of Classification Search ................ 439/630, 439/928.1, 299, 353, 680, 377; 455/558
See application file for complete search history.

(56) References Cited

U.S. PATENT DOCUMENTS 6,062,887 A * 5/2000 Schuster et al. ............ 439/218
6,101,372 A * 8/2000 Kubo .......................... 455/558
6,761,591 B1 * 7/2004 Zhou .......................... 439/630
6,969,282 B1 * 11/2005 Liu ............................. 439/630
2006/0160423 A1 * 7/2006 Lee ............................. 439/630

* cited by examiner

*Primary Examiner*—Tho D. Ta
(74) *Attorney, Agent, or Firm*—Jeffrey T. Knapp

(57) ABSTRACT

A chip card retaining mechanism for retaining a chip card (30) mounted in an electronic device is provided. The electronic device includes a housing (10) having a battery compartment (12) defined therein. The chip card retaining mechanism includes a receiving cavity (14) formed on the housing for receiving the chip card therein, and a locking member (20). The receiving cavity has an opening facing the battery compartment of the electronic device. The locking member is movably received in the receiving cavity with a first end thereof extending out of the opening. The locking member includes a resisting portion. The resisting portion is configured for abutting a first end of the chip card. The locking member configured for locking the chip card in the receiving cavity.

10 Claims, 5 Drawing Sheets

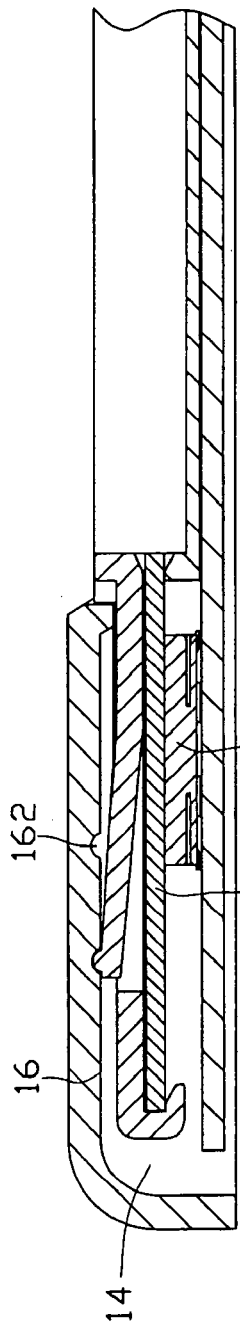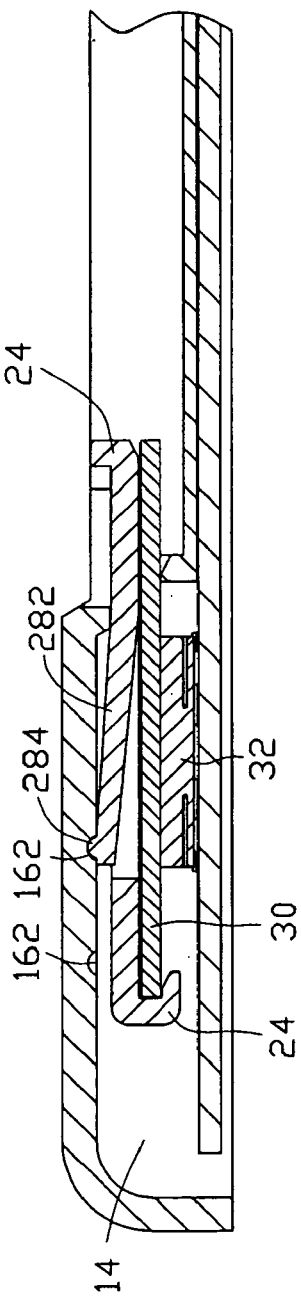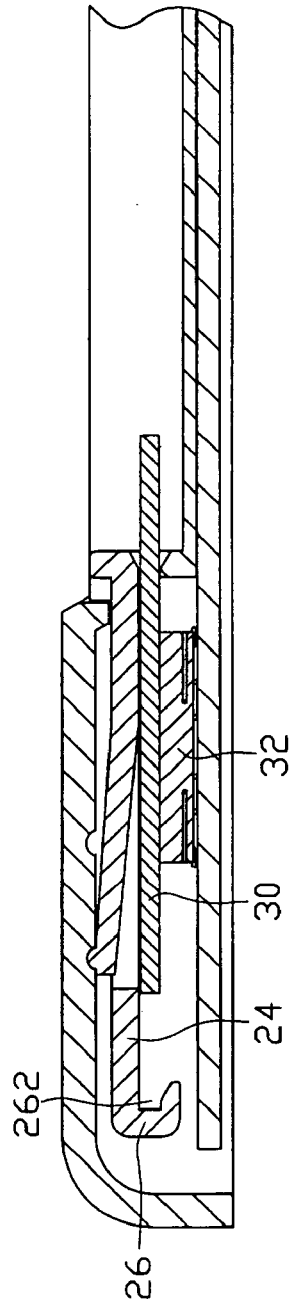

CHIP CARD RETAINING MECHANISM

TECHNICAL FIELD

The present invention generally relates to chip card retaining mechanisms and, more particularly, to a chip card retaining mechanism for seating a chip card in an electronic device such as a mobile phone.

BACKGROUND

Nowadays, electronic devices such as mobile phones are widely used and bring convenience to our lives, as such, electronic devices have become a part of modern life. Every electronic device has a chip card such as a SIM (subscriber identification module) card for carrying information necessary for operating the mobile phone. The chip card may also contain personal information for the subscriber, for example, a listing of frequently used telephone numbers. However, it is necessary to provide a chip card retaining mechanism to hold the chip card in the electronic device.

Referring to FIG. 7, a typical chip card retaining mechanism used in a mobile phone is as follows. The chip card retaining mechanism includes a mounting base 80 and a locking element 90. A receiving groove 801 is defined in the mounting base 80 for receiving a chip card. The locking element 90 includes a fixing portion 901, an operating portion 903 and a deformable portion 905. The locking element 90 is mounted on the mounting base 80. The fixing portion 901 protrudes over the receiving groove 801 to hold the chip card. When the operating portion 903 is pulled manually, the deformable portion 905 deforms and the fixing portion 901 moves away from the receiving groove 801, the chip card can thereby be removed from the receiving groove 801 of the mounting base 80.

It can be seen that the deformable portion 905 of the locking element 90 is very large, and a height of the deformable portion 905 will increase when pulling the operating portion 903. Thus, the chip card retaining mechanism occupies too much space, which results in an overly large size for electronic devices such as mobile phones. In addition, when a person is installing or removing the chip card, he or she must hold the mobile phone and operate the locking element 90 with one hand and remove the chip card simultaneously with another hand. That is, the chip card retaining mechanism can be difficult for users to operate. Furthermore, it is necessary to design a large battery cover to cover the chip card retaining mechanism and a battery of the mobile phone due to the retaining mechanism being exposed out of the mounting base 80. Thus, there is no sufficient space in a housing of the mobile phone to arrange other attachments such as a digital camera, speaker and so on.

What is needed, therefore, is a chip card retaining mechanism which overcomes the above-described shortcomings.

SUMMARY

A chip card retaining mechanism for mounting a chip card in an electronic device is provided. In one embodiment thereof, the electronic device includes a housing having a battery compartment defined therein. The chip card retaining mechanism comprises a receiving cavity formed on the housing for receiving the chip card therein, and a locking member. The receiving cavity has an opening facing the battery compartment of the electronic device. The locking member is movably received in the receiving cavity with a first end thereof extending out of the opening and an opposite second end thereof in the receiving cavity. The locking member includes a resisting portion. The resisting portion is configured for abutting a first end of the chip card. The locking member is configured for locking the chip card in the receiving cavity.

Other advantages and novel features of the preferred embodiments of the present hinge system and its applications will become more apparent from the following detailed description when taken in conjunction with the accompanying drawings.

BRIEF DESCRIPTION OF THE DRAWINGS

Many aspects of the present chip card retaining mechanisms and their applications can be better understood with reference to the following drawings. The components in the drawings are not necessarily drawn to scale, the emphasis instead being placed upon clearly illustrating the principles of the chip card retaining mechanisms. Moreover, in the drawings, like reference numerals designate corresponding parts throughout the several views.

FIG. 4 is an cross-sectional view taken along VI—VI line of FIG. 3, showing a first position of the chip card;

FIG. 5 is an cross-sectional view taken along VI—VI line of FIG. 3, showing a first position of the chip card;

FIG. 6 is an cross-sectional view taken along VI—VI line of FIG. 3, showing a third position of the chip card.

DETAILED DESCRIPTION OF PRIEFERRED EMBODIMENTS

Figure 1:
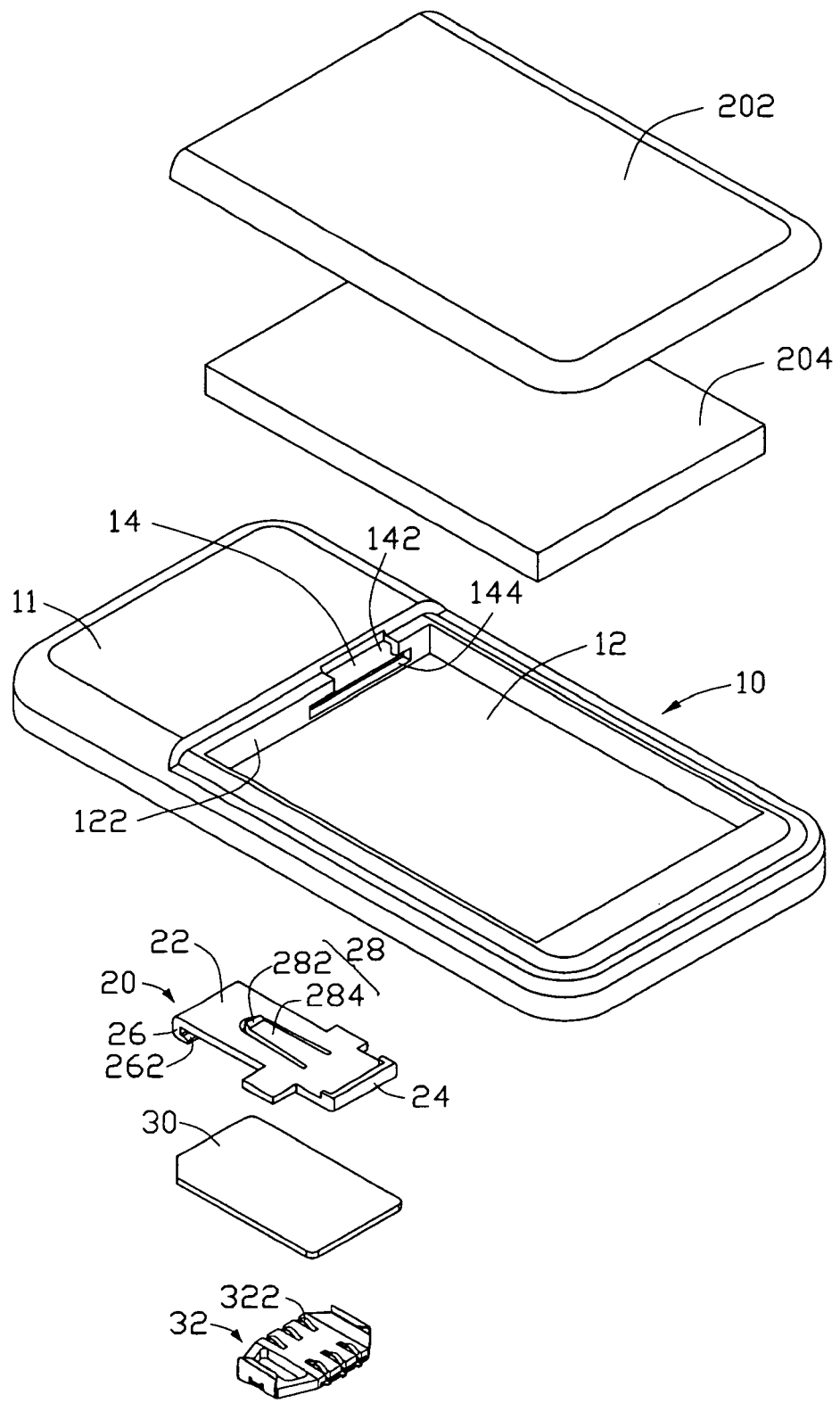
FIG. 1 is an exploded, isometric view of an electronic device, which employs a chip card retaining mechanism in accordance with a first preferred embodiment, the chip card retaining mechanism including a locking member.

A chip card retaining mechanism is adapted for retaining a chip card in an electronic device such that the chip card is electrically connected with a connector in the electronic device. Referring to FIG. 1, the chip card retaining mechanism is applied to an exemplary mobile phone, which includes a housing 10, and a battery cover 202. In order to identify the used mobile phone, when communicating, a chip card 30, such as a subscriber identification module, also called SIM-card, is provided. The housing 10 has a battery compartment 12 defined in an upper surface 11 thereof, and defined by an inner wall 122. The battery compartment 12 is for receiving a battery 204.

The chip card retaining mechanism includes a receiving portion such as a receiving cavity 14, and a locking member 20. The receiving cavity 14 is configured for receiving the chip card 30 and the locking member 20.

The receiving cavity 14 is defined in the housing 10, thus forming an inner surface 16 (referring to FIG. 4) on the housing 10. The receiving cavity 14 is adjacent to the battery compartment 12. The receiving cavity 14 has an opening (not labelled) facing the battery compartment 12 and defined in the inner wall 122 of the housing 10. The opening includes an upper opening 142 and a lower opening 144. The upper opening 142 communicates with the lower opening 144. A width of the upper opening 142 is slightly greater than or equal to that of the lower opening 144. The upper opening 142 is configured for movement of the locking member 20. The lower opening 144 is configured for insertion or withdrawl of the chip card 30 and insertion of locking member 20. The housing 10 has two spaced recesses 162 defined in the inner surface 16.

The chip card 30 carries information that is necessary for operating the telephone and personal information of the owner and is a kind of integrated circuit card. The chip card 30 is electrically connected to a printed circuit board (PCB, not shown) by a connector 32. The connector 32 is secured in receiving cavity 14 of the housing 10. The connector 32 has a plurality of elastic contacts 322. The chip card 30 is mounted in the receiving cavity 14 in contact with the elastic contacts 322 of the connector 32.

Figure 2:
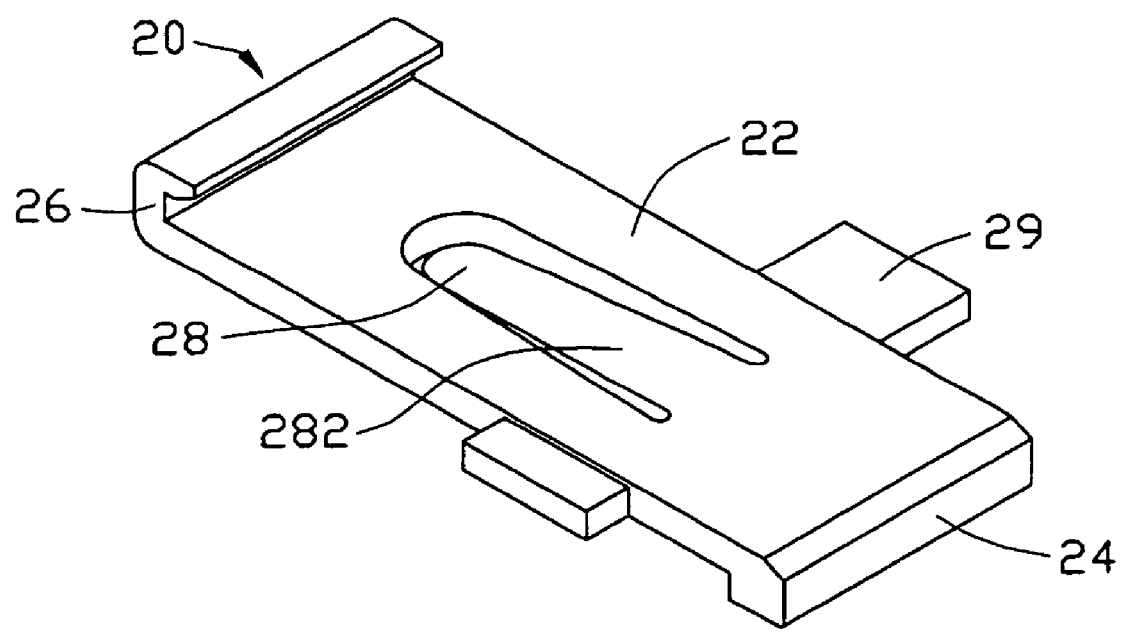
FIG. 2 is an isometric view of the locking member of FIG. 1.

Referring also to FIG. 2, the locking member 20 is movably received in the receiving cavity 14, thus producing a receiving space between the locking member 20 and the connector 32 for receiving the chip card 30. The locking member 20 is plate shaped. The locking member 20 includes a planar body 22, an operating portion 24 disposed at a first end of the planar body 22, a hook 26 as a resisting portion disposed at an opposite second end of the planar body 22, and an elastic arm 28 disposed centrally on the planar body 22. The operating portion 24 extends vertically from the first end of the planar body 22 toward a first surface of the planar body 22. The hook 26 extends vertically from the second end of the planar body 22 from an opposite second surface of the planar body 22. The hook 26 defines a slot 262 therein for receiving a first end of the chip card 30. The planar body 22 is cut to form a U-shaped slit, thus forming the elastic arm 28. The elastic arm 28 includes an elastic portion 282 extending from the planar body 22 and a protrusion 284 arranged at a distal end of the elastic portion 282. The protrusion 284 can engage in each of the recesses 162 of the housing 10. The locking member 20 has two opposite wings 29 extending from two opposite sides thereof. The two wings 29 are arranged in a manner so as to be spaced both from the operating portion 24 and the hook 26. A distance between the two wings 29 is equal to or less than a width of the lower opening 144 of the housing 10.

Figure 3:
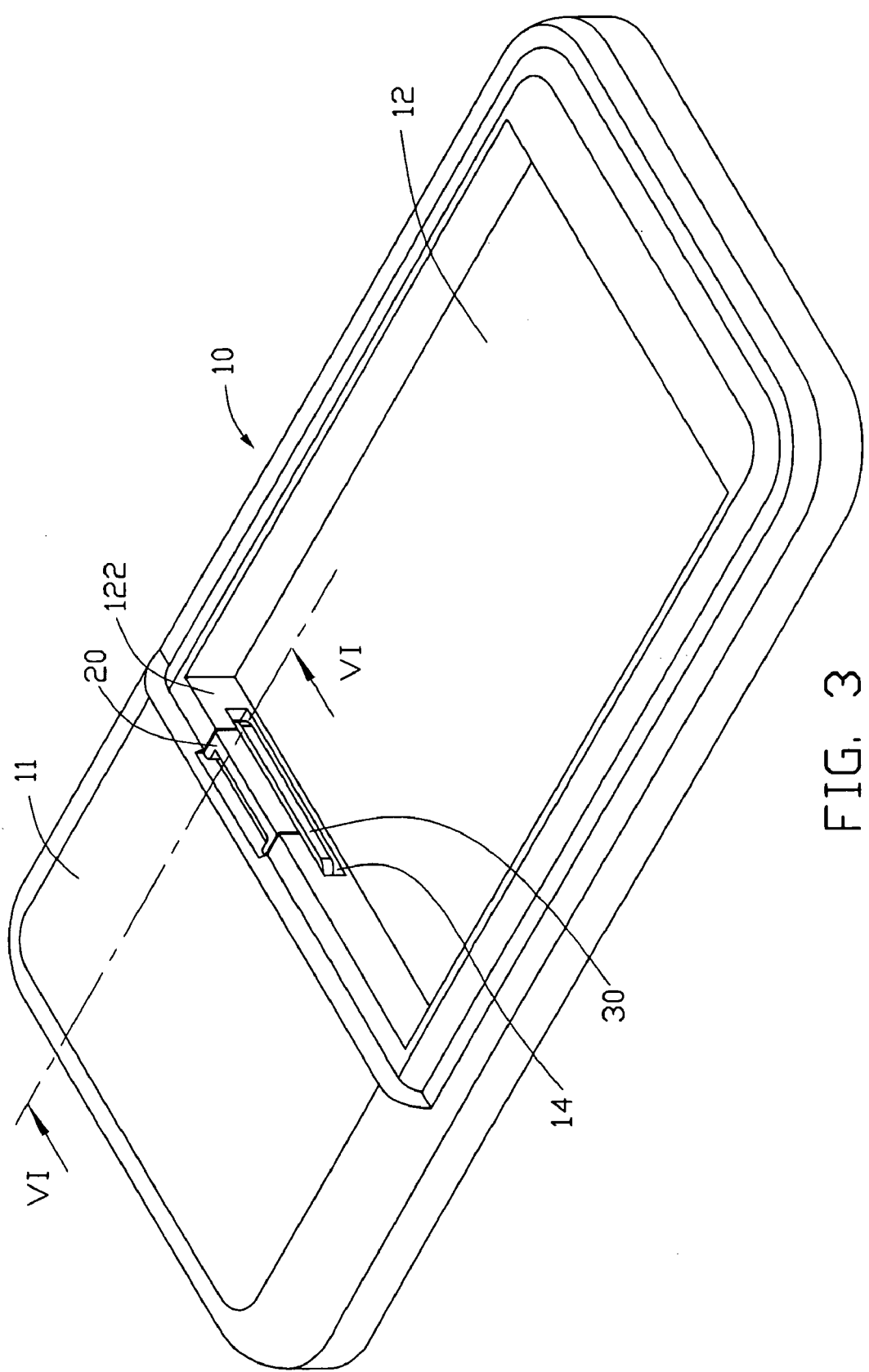
FIG. 3 is an assembled, isometric view of the electronic device of FIG. 1.
Figure 7:
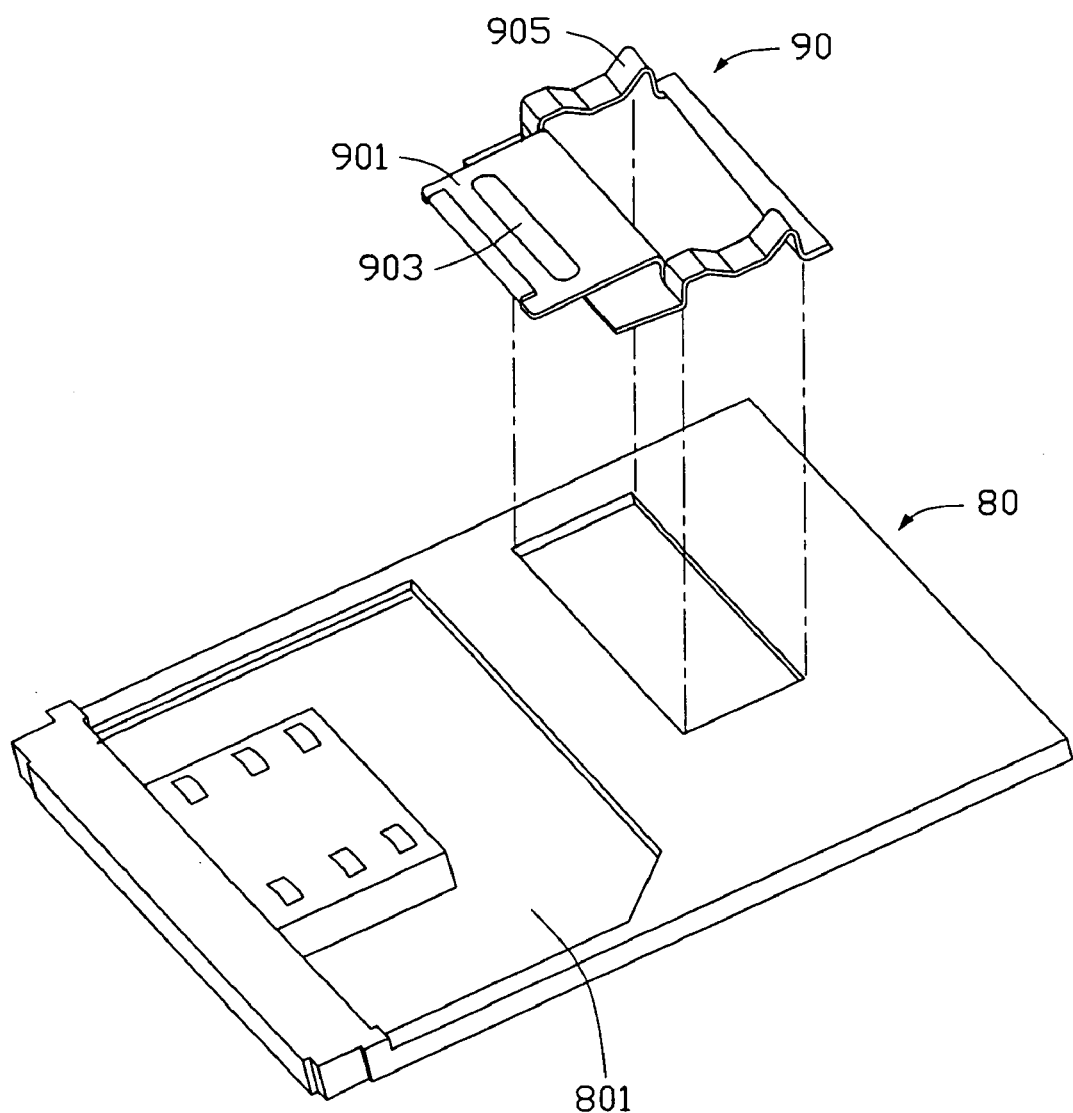
FIG. 7 is an exploded, isometric view of a typical chip card retaining mechanism.

Referring to FIGS. 3 and 4, the locking member 20 is mounted in the receiving cavity 14, with the operating portion 24 of the locking member 20 exposing out of the upper opening 142 and movably engaging in the upper opening 142. The protrusion 284 of the locking member 20 engages in one recess 162 of the housing 10. In assembly and mounting of the chip card 30, the chip card 30 is pushed into the receiving cavity 14 via the lower opening 144 and slides in the receiving cavity 14. When the chip card 30 is completely inserted into the receiving cavity 14, the first end of the chip card 30 is fittingly received in the slot 262 of the hook 26 of the locking member 20 and abuts the hook 26. In this state, the chip card 30 is stably held between the locking member 20 and the connector 32 by an elastic force of the elastic portion 282 of the locking member and the elastic contacts 322 of the connector 32, and thus cannot fall out of the receiving cavity 14.

Referring to FIGS. 5 and 6, when removing the chip card 30, at first, the locking member 20 is pulled toward the battery compartment 12 by an outer force via the operating portion 24, with the chip card 30 moving toward the battery compartment 12 due to interaction with the hook 26. Simultaneously, the protrusion 284 of the locking member 20 retreats from the recess 162 and abuts against the inner surface 162 of the housing 10 such that the elastic portion 282 of the locking member 20 twists a predetermined elastic force. When the protrusion 284 of the locking member 20 engages in another recess 162 of the housing 10, the first end of the chip card 30 is exposed out of the receiving cavity 14. In this time, the locking member 20 stops moving toward the battery compartment 12, and is pulled into the receiving cavity 14 to an original position in an reverse direction. The chip card 30 does not move with the locking member 20 due to a friction between the chip card 30 and the elastic contacts 322 of the connector 32. Then, a user can pull the chip card 30 out of the receiving cavity 14 completely by holding the chip card 30. As such, the chip card 30 can be removed from the housing 10.

When pulling the locking member 20, the present chip card 30 can avoid excessively strain on the locking member 20 because of the protrusion 284 engaging in the recess 162 of the housing 10, thus preventing damage to the chip card retaining mechanism. The chip card retaining mechanism merely includes two simple elements, i.e. the housing 10, and the locking member 20. Thus, the chip card retaining mechanism is quite simple. In addition, the locking member 20 is thin and as a result the chip card retaining mechanism does not occupy much space. Furthermore, the chip card retaining mechanism is arranged in the receiving cavity 14 of the housing 10, it does not require a large battery cover to cover the chip card retaining mechanism.

In alternative embodiments, the wings 29 can be one or more, and also can be of other shapes. The operating portion 24 of the locking member 20 may be omitted. The first end of the locking member 20 may be exposed out of the receiving cavity 14 for a user to operate. The elastic arm 28 may also be omitted. A protrusion may be provided on a surface of the locking member 20, and selectively engaged in the recesses 162 of the housing 10.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A chip card retaining mechanism for retaining a chip card mounted in an electronic device, the electronic device including a housing, the housing having a battery compartment defined therein, the chip card retaining mechanism comprising:
   a receiving cavity defined in the housing for receiving the chip card therein, the receiving cavity having an opening facing the battery compartment of the electronic device; and
   a locking member movably received in the receiving cavity with a first end thereof extending out of the opening and an opposite second end thereof in the receiving cavity, the locking member including a resisting portion formed at the second end, the resisting portion being configured for abutting a first end of the chip card, the locking member configured for locking the chip card in the receiving cavity, the locking member has at lease one wing extending from a given side thereof; the wing is arranged in a manner so as to be spaced both from the first end and the opposite second end;
   wherein the locking member includes a planar body;
   wherein the locking member further comprises an elastic arm extending therefrom and abutting an inner surface of the housing;

wherein the elastic arm includes an elastic portion and a protrusion formed at a distal end of the elastic portion, the housing has at least two spaced recesses defined in the inner surface of the housing, the protrusion selectively engaging in one of the recesses;

wherein the elastic arm is formed by cutting the planar body to form an U-shaped slit.

2. The chip card retaining mechanism as claimed in claim 1, wherein the locking member further includes an operating portion formed at the first end thereof.

3. The chip card retaining mechanism as claimed in claim 1, wherein the resisting portion extends vertically from the second end of the planar body toward one surface of the planar body.

4. The chip card retaining mechanism as claimed in claim 3, wherein the resisting portion is a hook defining a slot for receiving and abutting the first end of the chip card.

5. A chip card retaining mechanism for retaining a chip card mounted in an electronic device, the electronic device including a housing having a compartment defined therein, the chip card retaining mechanism comprising:

a receiving cavity defined in the housing for receiving the chip card therein, the receiving cavity having an opening facing the compartment of the electronic device; and a locking member movably received in the receiving cavity with a first end thereof movably engaging in the opening, the locking member including a resisting portion and an elastic arm, the resisting portion being configured for abutting a first end of the chip card, the elastic arm elastically abutting against an inner surface of the housing in a manner such that the locking member locks the chip card in the receiving cavity, the locking member has at least one wing extending from a given side thereof; the wing is arranged in a manner so as to be spaced both from the first end and the opposite second end;

wherein the locking member includes a planar body;

wherein the locking member further comprises an elastic arm extending therefrom and abutting an inner surface of the housing;

wherein the elastic arm includes an elastic portion and a protrusion formed at a distal end of the elastic portion, the housing has at least two spaced recesses defined in the inner surface of the housing, the protrusion selectively engaging in one of the recesses;

wherein the elastic arm is formed by cutting the planar body to form an U-shaped slit.

6. The chip card retaining mechanism as claimed in claim 5, wherein the locking member further includes an operating portion formed at the first end thereof.

7. The chip card retaining mechanism as claimed in claim 5, wherein the resisting portion extends vertically from a second end of the planar body toward one surface of the planar body, the second end being opposite to the first end of the locking member.

8. The chip card retaining mechanism as claimed in claim 7, wherein the resisting portion is a hook defining a slot for receiving and abutting the first end of the chip card.

9. An electronic device comprising:

a housing, the housing having a battery compartment defined therein;

a chip card retaining mechanism comprising:

a receiving cavity defined in the housing for receiving the chip card therein, the receiving cavity having an opening facing the battery compartment of the electronic device; and a locking member movably received in the receiving cavity with a first end thereof extending out of the opening, the locking member including a resisting portion, the resisting portion being configured for abutting a first end of the chip card, the locking member configured for locking the chip card in the receiving cavity, the locking member has at least one wing extending from a given side thereof; the wing is arranged in a manner so as to be spaced both from the first end and the opposite second end;

wherein the locking member includes a planar body;

wherein the locking member further comprises an elastic arm extending therefrom and abutting an inner surface of the housing;

wherein the elastic arm includes an elastic portion and a protrusion formed at a distal end of the elastic portion, the housing has at least two spaced recesses defined in the inner surface of the housing, the protrusion selectively engaging in one of the recesses;

wherein the elastic arm is formed by cutting the planar body to form an U-shaped slit;

a connector secured in the receiving cavity of the housing, and including a plurality of elastic contacts electrically contacting the chip card, the chip card being hold between the locking member and the connector from being withdrawn from the receiving cavity.

10. The chip card retaining mechanism as claimed in claim 9, wherein the resisting portion is a hook defining a slot for receiving and abutting the first end of the chip card.

* * * * *